United States Patent Office 2,721,804
Patented Oct. 25, 1955

2,721,804
STABILIZATION OF ORGANIC COMPOUNDS
Robert H. Rosenwald, Western Springs, Ill., assignor to Universal Oil Products Company, Des Plaines, Ill., a corporation of Delaware
No Drawing. Application December 16, 1953, Serial No. 398,650
8 Claims. (Cl. 99—163)

This application is a continuation-in-part of my copending application Serial Number 188,643, filed October 5, 1950, now abandoned, and relates to the stabilization of organic compounds by incorporating therein a mixture of particular antioxidants.

The novel features of the present invention may be utilized for the stabilization of organic compounds which undergo oxidative deterioration during storage, transportation, treatment and/or use, with resultant formation of undesirable gum, discoloration, rancidity or other deleterious reaction products. The organic compounds which may be treated in accordance with the present invention include motor fuel and particularly unsaturated gasoline as, for example, cracked gasoline, polymer gasoline, etc., substantially saturated gasolines to which materials are added which decompose or otherwise render the gasoline unstable as, for example, the addition of tetraethyl lead to aviation gasoline, mixtures of cracked and straight-run gasolines, etc., diesel fuel, fuel oil, mineral oil, lubricating oil, drying oil, greases, rubber, waxes, edible and inedible fats and oils, etc.

The present invention is particularly applicable to the stabilization of fatty materials, including both solid and liquid. It is especially applicable to the stabilization of edible fats and oils including, for example, linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats. It is understood that other oils and fats may be treated, including oils and fats which previously have been subjected to treatment such as blowing with air, heat treatment, etc.

The particular antioxidant composition of the present invention is especially advantageous for use in food products because one of the components has been approved for such use and it is expected that the other components soon will be approved for such use. Furthermore, the use of the mixture of components results in a composition of increased solubility and also, when used in the treatment of oil or fat used for cooking, frying, baking, etc., the antioxidant properties carry-over into the cooked and baked products so as to render them stable and retard rancidity development therein. Still further, the use of the improved mixture of the present invention has greater applicability because, as happens with many antioxidants, one is more effective in one substrate while the other may be more effective in another substrate. In the case of the present composition, the improved results are obtained in a greater variety of substrates than would be obtainable with the use of only one of the components.

In one embodiment the present invention relates to a method of stabilizing an organic compound subject to oxidative deterioration which comprises incorporating therein an antioxidant composition comprising NDGA and 2,4,6-trialkylphenol.

In a specific embodiment the present invention relates to a method of stabilizing a fatty material against rancidity which comprises incorporating therein from about 0.0001% to about 1% by weight of an antioxidant composition comprising from about 1 to about 20 parts by weight of NDGA and from about 1 to about 20 parts by weight of 2,6-di-tert-butyl-4-methylphenol.

In still another embodiment the present invention relates to an organic compound subject to oxidative deterioration containing a stabilizing amount of the antioxidant composition herein set forth.

In still another embodiment the present invention relates to an antioxidant composition comprising NDGA and 2,4,6-trialkylphenol.

As hereinbefore set forth, the mixture of NDGA (nordihydroquaiaretic acid) and 2,6-di-tert-butyl-4-methylphenol offers numerous advantages including (1) a composition which will soon be approved for use in food products, (2) a composition of improved solubility properties, (3) a composition which will effect both an increase in the shelf life of the edible fat and oil and also will carry-over into the baked or cooked products, (4) a composition which will be more effective in a greater variety of substrates, etc. These important advantages are obtainable because of several peculiar properties of the components of the antioxidant composition. In the first place, these components are compatable with each other, and one component does not offset or hinder the functions of the other. Another important advantage is that these improved results are obtained through the use of smaller amounts of the more expensive NDGA than otherwise would be required. One of the reasons for the limited commercial use of NDGA has been its high cost. The novel process of the present invention offers the benefits thereof without the disadvantage of the high cost and, as hereinbefore set forth, offers the still further advantage of carry-through properties which are not obtainable even when using the expensive NDGA alone.

As hereinbefore set forth, the novel antioxidant composition is particularly applicable to the stabilization of fatty materials, including both solid and liquid. In another embodiment, the novel antioxidant composition may be utilized to treat forage crops, either before or after cutting. In still another embodiment the novel composition may be utilized in waxes which are employed as coatings for containers for food products including, for example, wax paper, wax cartons, etc. In still another embodiment the antioxidant composition may be incorporated directly into the cardboard or other container used for food products and thereby will retard rancidity development in the food products. Other specific applications of the antioxidant composition of the present invention include its use for the stabilization of vitamins, including those contained in oils and fats and those prepared synthetically or recovered from other sources, such as ascorbic acid, etc. Still another application includes the use of the antioxidant composition in the stabilization of essential oils, fruit juices, etc.

Nordihydroquaiaretic acid is referred to in the industry as NDGA and, therefore, is being similarly referred to in the present specifications and claims. A preferred 2,4,6-trialkylphenol for use in the antioxidant composition of the present invention is 2,6-di-tert-butyl-4-methylphenol. Other 2,4,6-trialkylphenols include 2,6-di-iso-propyl-4-methylphenol, 2,6-di-tertiary-amyl-4-methylphenol, 2,6-di-tertiary-hexyl-4-methylphenol, 2,6-di-tertiary-heptyl-4-methylphenol, 2,6-di-tertiary-octyl-4-methylphenol, 2,6-di-tertiary-nonyl-4-methylphenol, 2,6-di-tertiary-decyl-4-methylphenol, 2,6-di-tertiary-undecyl-4-methylphenol, 2,6-di-tertiary-dodecyl-4-methylphenol, etc., and similar compounds in which the methyl group is replaced by ethyl, propyl, butyl, amyl, hexyl, etc. Other compounds include 2,4-dimethyl-6-tertiary-butylphenol, 2,4-diethyl-6-tertiary-butylphenol, 2,4-dipropyl-6-tertiary-butylphenol, 2,4-diheptyl-6-tertiary-butylphenol, 2,4-dioctyl-6-tertiary-butylphenol, etc., and similar compounds in which the tertiary-butyl group is replaced by iso-propyl, tertiary-amyl, tertiary-hexyl, tertiary-heptyl, tertiary-octyl, tertiary-nonyl, tertiary-decyl, tertiary-undecyl, tertiary-dodecyl, etc.

group. Still other compounds comprise 2,4,6-tripropylphenol, 2,4,6-tributylphenol, 2,4,6-triamylphenol, 2,4,6-trihexylphenol, 2,4,6-triheptylphenol, 2,4,6-trioctylphenol, etc. It is understood that a mixture of trialkylphenol compounds may be used in the antioxidant composition.

In some cases, the antioxidant composition may contain additional components as, for example, certain acids such as citric acid, ascorbic acid, tartaric acid, phosphoric acid, etc. In place of or in addition to the acids, the esters may be employed as, for example, isopropyl citrate, etc. It also may be desirable to include certain esters of gallic acid and particularly propyl gallate.

The antioxidant composition may be either liquid or solid. When desired, the antioxidant composition may be dissolved in a suitable solvent including alcohols, aldehydes, ketones, etc. When used in food products, the solvent preferably comprises propylene glycol, glycerine, etc. In some cases, the antioxidant composition may be dissolved in a small portion of the substrate and this solution may be incorporated in the main portion of the substrate. When used as a solid the antioxidant composition may be in the form of discreet particles of uniform or irregular size and shape as formed by extrusion, flaking or other suitable methods.

The proportions of NDGA and 2,6-di-tert-butyl-4-methylphenol may vary considerably depending upon the particular substrate to be treated. In general, at least one part by weight of one component should be employed per 20 parts by weight of the other component. These weight proportions are based upon the NDGA and 2,6-di-tert-butyl-4-methylphenol only and are exclusive of solvent and other components in the antioxidant composition. When citric acid or the like and/or propyl gallate or the like are employed, they generally will comprise not more than about 25% by weight each of the sum total of NDGA and 2,6-di-tert-butyl-4-methylphenol and preferably will comprise from about 5 to about 20% by weight thereof. The solvent, when employed, may comprise from about 10% to about 90% of the total antioxidant composition.

The amount of the antioxidant composition to be used in the organic compound to be stabilized may vary depending upon the particular substrate in which it is to be used. In general, the amount of antioxidant composition (based on the total of NDGA and 2,6-di-tert-butyl-4-methylphenol) will range from about 0.0001% to about 1% by weight of the substrate and preferably from about 0.001% to about 0.1% by weight thereof. The antioxidant composition may be prepared as a mixture and then incorporated in the substrate, or one component may be added first and the other component subsequently added thereto.

The following examples are introduced to illustrate further the novelty and utility of the present invention but not with the intention of unduly limiting the same.

*Example I*

The lard used in this example had a normal stability period of 2 hours as determined by the Swift test. This test is described in detail in the article by A. E. King, H. L. Roschen and W. H. Irwin, which appeared in Oil and Soap, vol. X, No. 6, pages 106–109 (1933), and modified as described in the article by R. W. Reimenschneider, J. Turer and R. M. Spec, which appeared in Oil and Soap, pages 169–171, September 1943. In general, this test comprises bubbling air through a sample of the lard and determining rancidity organoleptically and by peroxide values.

Upon the addition to a sample of the lard of 0.012% by weight of an antioxidant composition comprising equal parts by weight of NDGA and of 2,6-di-tert-butyl-4-methylphenol, the stability of the lard was increased from 2 hours to 33½ hours.

*Example II*

0.024% by weight of an antioxidant composition comprising equal parts of NDGA and of 2,6-di-tert-butyl-4-methylphenol, was incorporated into another sample of the lard described in Example I and this served to increase the stability of the lard to 41½ hours.

*Example III*

Lard having a normal stability period of 5 hours is stabilized by adding thereto 0.02% by weight of an antioxidant composition comprising 45% by weight of 2,6-di-tert-butyl-4-methylphenol, 25% by weight of NDGA, 18% by weight of propyl gallate and 12% by weight of citric acid. The stabilized lard will have a long shelf life and also, when used for baking, will retard rancidity in the baked products for a considerable time.

*Example IV*

Corn oil may be stabilized by incorporating therein 0.025% by weight of an antioxidant composition comprising 70% by weight of 2,6-di-tert-butyl-4-methylphenol and 30% by weight of NDGA.

*Example V*

Cracked gasoline may be stabilized against deterioration in storage by adding thereto 0.006% by weight of an antioxidant composition comprising 80% by weight of 2,6-di-tert-butyl-4-methylphenol and 20% by weight of NDGA.

*Example VI*

Paraffin wax used as coating for containers for food products is stabilized by incorporating therein an antioxidant composition comprising 60% by weight of 2,6-di-tert-butyl-4-methylphenol and 40% by weight of NDGA.

I claim as my invention:

1. A method of stabilizing a fatty material against rancidity which comprises incorporating therein a stabilizing amount of an antioxidant composition comprising from about 1 to about 20 parts by weight of NDGA and from about 1 to about 20 parts by weight of 2,4,6-trialkylphenol.

2. A method of stabilizing a fatty material against rancidity which comprises incorporating therein from about 0.0001% to about 1% by weight of an antioxidant composition comprising from about 1 to about 20 parts by weight of NDGA and from about 1 to about 20 parts by weight of 2,6-di-tert-butyl-4-methylphenol.

3. A fatty material subject to oxidative deterioration containing a stabilizing amount of an antioxidant composition comprising from about 1 to about 20 parts by weight of NDGA and from about 1 to about 20 parts by weight of 2,4,6-trialkylphenol.

4. A fatty material subject to rancidity containing a stabilizing amount of an antioxidant composition comprising from about 1 to about 20 parts by weight of NDGA and from about 1 to about 20 parts by weight of 2,6-di-tert-butyl-4-methylphenol.

5. Lard subject to rancidity containing from about 0.0001% to about 1% by weight of an antioxidant composition comprising from about 1 to about 20 parts by weight of NDGA and from 1 to about 20 parts by weight of 2,6-di-tert-butyl-4-methylphenol.

6. A fatty material subject to oxidative deterioration containing from about 0.0001% to about 1% by weight of an antioxidant composition comprising from about 1 to about 20 parts by weight of NDGA and from about 1 to about 20 parts by weight of 2,6-di-tert-butyl-4-methylphenol.

7. An antioxidant composition comprising from about 1 to about 20 parts by weight of NDGA and from about 1 to about 20 parts by weight of 2,4,6-trialkylphenol.

8. An antioxidant composition comprising from about 1 to about 20 parts by weight of NDGA and from about 1 to about 20 parts by weight of 2,6-di-tert-butyl-4-methylphenol.

No references cited.